(12) United States Patent
Wendel et al.

(10) Patent No.: US 9,298,473 B2
(45) Date of Patent: Mar. 29, 2016

(54) SYSTEM AND METHOD FOR A GENERIC OBJECT ACCESS LAYER

(75) Inventors: Andreas Wendel, Bickenbach (DE); Frank Nuxoll, Neckargemuend (DE)

(73) Assignee: SAP SE, Walldorf (DE)

( * ) Notice: Subject to any disclaimer, the term of this patent is extended or adjusted under 35 U.S.C. 154(b) by 970 days.

(21) Appl. No.: 12/915,497

(22) Filed: Oct. 29, 2010

(65) Prior Publication Data

US 2012/0110547 A1 May 3, 2012

(51) Int. Cl.
*G06F 9/44* (2006.01)
*G06Q 10/06* (2012.01)

(52) U.S. Cl.
CPC .............. *G06F 9/4428* (2013.01); *G06Q 10/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,070,152 | A * | 5/2000 | Carey | G06Q 40/00 705/35 |
| 6,249,905 | B1 * | 6/2001 | Yoshida et al. | 717/100 |
| 7,516,439 | B2 * | 4/2009 | Robinson | G06F 8/00 707/999.101 |
| 7,574,689 | B2 * | 8/2009 | Igelbrink et al. | 717/100 |
| 7,962,920 | B2 * | 6/2011 | Gabriel | G06F 8/20 708/110 |
| 2004/0148375 | A1 * | 7/2004 | Levett | G06F 9/46 709/223 |
| 2004/0187140 | A1 * | 9/2004 | Aigner et al. | 719/328 |
| 2006/0036745 | A1 * | 2/2006 | Stienhans | G06F 8/38 709/228 |
| 2006/0074942 | A1 * | 4/2006 | Shaburov | G06F 17/30306 |
| 2007/0016557 | A1 * | 1/2007 | Moore | G06Q 10/10 |
| 2007/0033088 | A1 * | 2/2007 | Aigner et al. | 705/9 |
| 2007/0038963 | A1 * | 2/2007 | Moore | G05B 23/0267 715/859 |
| 2007/0100961 | A1 * | 5/2007 | Moore | G06F 9/5072 709/217 |
| 2008/0114798 | A1 * | 5/2008 | Robinson | 707/101 |
| 2008/0120129 | A1 * | 5/2008 | Seubert | G06Q 10/06 705/35 |
| 2008/0187121 | A1 * | 8/2008 | Agarwal et al. | 379/218.01 |
| 2008/0305792 | A1 * | 12/2008 | Khetawat | H04W 88/12 455/435.1 |
| 2009/0164939 | A1 * | 6/2009 | Ishimitsu | G06F 9/4443 715/805 |
| 2009/0172635 | A1 * | 7/2009 | Auriemma | G06F 8/36 717/107 |
| 2010/0063971 | A1 * | 3/2010 | Cragun | G06F 17/30997 707/741 |
| 2010/0153150 | A1 * | 6/2010 | Prigge | G06Q 10/063 705/7.11 |
| 2010/0217783 | A1 * | 8/2010 | Farver | H04L 67/36 707/805 |
| 2010/0248788 | A1 * | 9/2010 | Yook | G06F 3/0481 455/566 |
| 2011/0022978 | A1 * | 1/2011 | Keller | G06F 9/4443 715/771 |
| 2013/0154962 | A1 * | 6/2013 | Kim | G06F 3/0488 345/173 |

* cited by examiner

*Primary Examiner* — Hien Duong
(74) *Attorney, Agent, or Firm* — Kenyon & Kenyon LLP

(57) ABSTRACT

An object access interface is described that effectively decouples a functional layer from a user interface (UI) layer. In the context of pre-existing functional objects that are specifically tailored to a pre-existing UI, a single entry point access-interface may define generic and object-specific functions. The function may be used to collect input routed to the associated function object, compile an input set in a form similar to how the pre-existing UI provided input sets, and process the compiled input and any resulting outputs from the function object.

15 Claims, 8 Drawing Sheets

SYSTEM AND METHOD FOR A GENERIC OBJECT ACCESS LAYER

BACKGROUND

Many large scale software packages provide enormous amounts of software modules including low level functions and elaborate graphical user interfaces. In some large scale software suites, such as the several packages provided by SAP® AG, the software may contain a very large, and ever growing number of business functions that model certain business processes in the software suite environment. These business processes have been designed and developed directly in the associated, proprietary GUI. As a result, the fixed behavior of the business processes may be directly tied to the fixed functionality of the GUI. To be able to use the designed processes and the already developed business logic in other ways, like in a new proprietary UI technology, the existing business logic has to be offered in an UI-independent-way. Thus, there is a need for the business logic to be decoupled from the proprietary GUI.

The inventors have identified and constructed systems and methods, which offer the possibility to decouple existing business logic from the proprietary GUI.

DETAILED DESCRIPTION

For building new UI technologies on top of existing business logic to create timeless software packages, the existing business logic may be offered in a UI-independent way. In many proprietary software suites, a lot of applications do not have such a UI-independent way or the UI-independent way is incompatible with the business logic offered in the proprietary GUI. Example embodiments of the present invention define systems and methods, along with important basis-classes, which define a framework for applications to offer their existing business logic in a decoupled way. Example embodiments offer stateful access to the business logic including an enhancement concept and offering different information like input-state or meta-information for the application-specific business objects.

In existing software packages, many processes and applications have been realized by offering functions directly tied to the existing GUI framework. Due to the long development period (e.g., decades), the architecture of the created programs includes designing business-logic and business-processes directly coupled to the proprietary GUI. Example embodiments of the present invention provide systems and methods to leverage the existing UI-logic framework and the existing business-logic framework, while decoupling the two. This may be necessary for offering existing business-logic via new UI-technologies, to include business logic in so-called timeless software layers or to offer business logic via new interfaces like web services.

Figure 1:
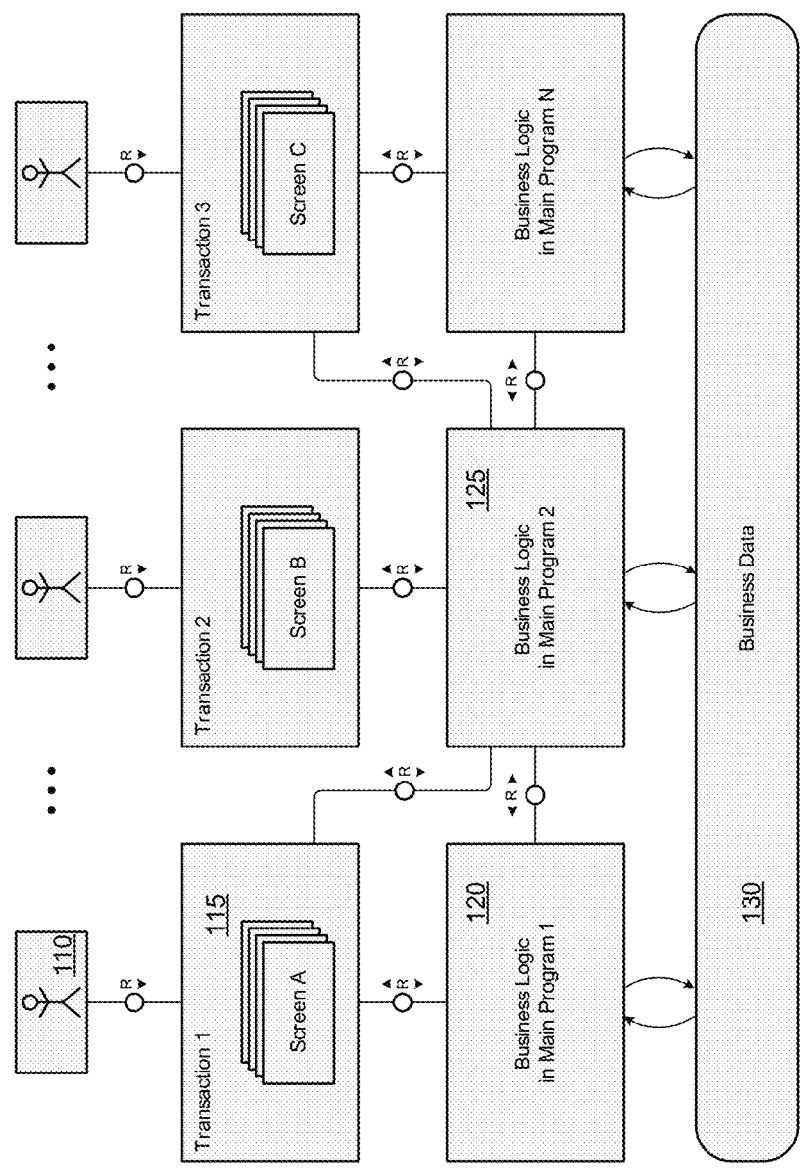
FIG. 1 illustrates an example of a pre-existing architecture, in the context of one example embodiment of the present invention.

FIG. 1 illustrates one example context of the preexisting software suite architecture. A user 110 may perform a transaction with the software suite. The transaction 115 may include a series of defined GUIs, such as Screen A of 115. These GUIs may reference a set of functions, which may model a process that is used by the user 110 for performing some function (e.g., their job role within the organization). The GUI may call on more than one set of functions (e.g., business logic 120 and business logic 125, etc.), and those may access and manipulate underlying business data 130. The legacy business logic programs, e.g., 120, may have been implemented directly dependent on the legacy GUI architecture, e.g., transaction 115. Thus, the system illustrated in FIG. 1, may include business logic programs that expect a specific sequence of inputs, e.g., as the legacy GUIs are configured to provide.

There are currently application programming interfaces (APIs) that attempt to provide a more flexible access to legacy functionality, for example the Business Application Programming Interface (BAPI) provided by SAP AG. However, current APIs have several deficiencies. One issue may be that the business logic offered in the API differs in some way from the business logic in the legacy GUI. If the API offers a differing logic than the logic in the legacy GUI, then the end user may receive inconsistent results, since the user may expect a well-known system behavior independent of whether it is offered via an API or a GUI. Thus, data processing, message handling, and error handling should be mostly the same. In addition it may be important that business processes work the same way independently if an API or a GUI is used. For example, there may be some special business logic e.g., for account determination, which is only called via a GUI. In this case a business document created with the GUI may be different than a business document which is created via the API with differing logic, even if the same input data is used. These inconsistent results can lead to system errors, and generally produce undesirable results. Further, a simple API might not offer a stateful-access to the existing business logic, which may lead to problems like poor performance and inconsistent/illogical message handling for UI development.

For UI development, a state-full API may have significant performance advantages. In this case the API may care about buffering of data. The UI may only need to provide delta updates, which reduces traffic between frontend and backend, because only a smaller set of data may be necessary. Further, a simple API might be unable to provide necessary information for UIs, such as value helps or input-state information. For example, applications can provide, via the object access class, information regarding a ready-for-input state on a field level. This may be useful for UI development, where depending on a business context and the state of the business transaction, only one set of fields is ready-for-input whereas others are not. The same may apply for input helps, which may support users with default values they can enter.

User-Exits and other already used customer-enhancements are not considered via the existing APIs. User-Exits are defined points within a standard program, where customers can enhance the existing business logic with their customer-specific-logic. During program execution (e.g., in the classical GUI) the source code is executed and within this source code additional customer code is executed. An API that does not consider the existing source code, where these user exits are performed or where they could not be performed, because the context is different, then customers who already implemented custom logic, would have to implement it a second time. In contrast to a simple API, example embodiments of the present invention may offer the possibility to re-use many parts of the still existing business-logic, and existing user-exits may be implicitly re-used.

Figure 2:
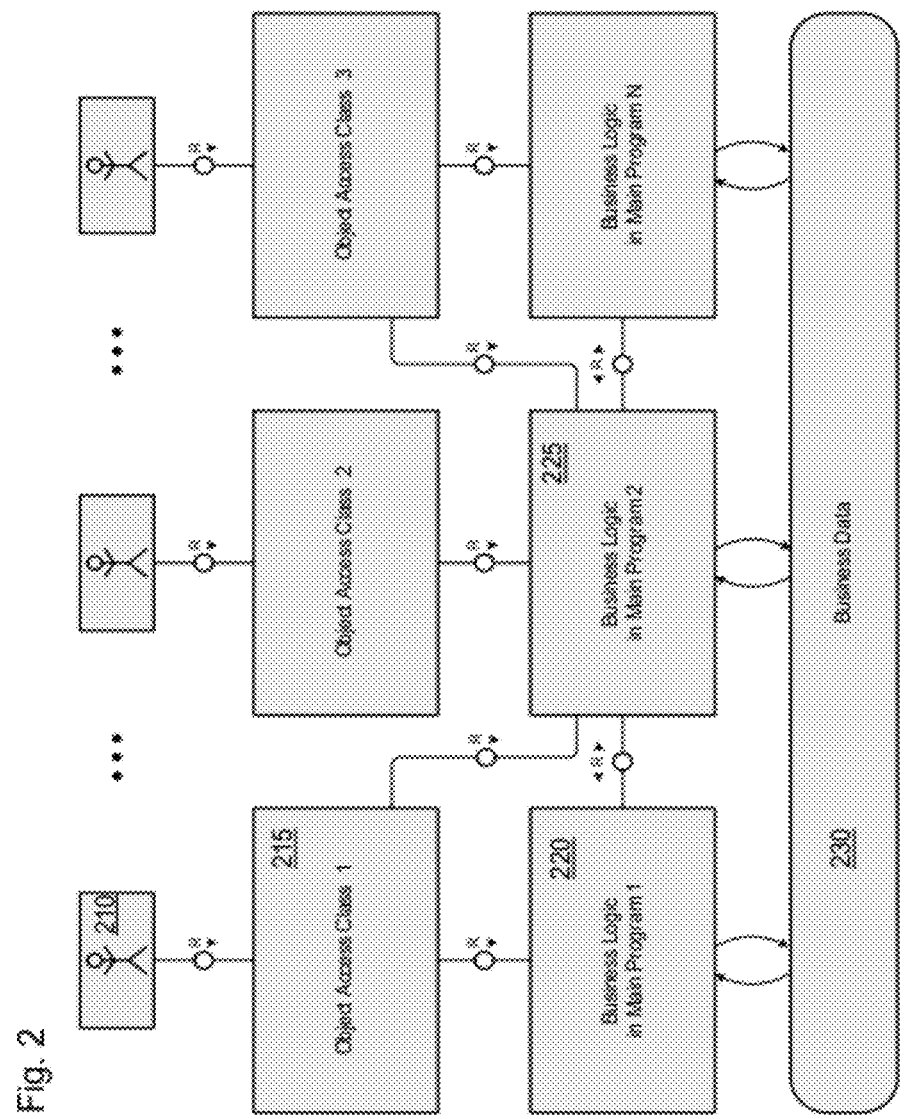
FIG. 2 illustrates a modified architecture including one example embodiment of the present invention.

To overcome these issues, example embodiments of the present invention create a generic object access layer that may reuse most parts of the existing business logic and replace the processing of classical screens with their PBO (Process Before Output) and PAI (Process After Input) parts by framework specific PBO and PAI methods. In example embodiments, each business object (e.g. sales order, delivery, and invoice) may be made available via so-called object-access classes. These classes may then act as a single-point of communication to a business-object. This business object may contain different sub-objects that can be read and changed via methods of the access class (e.g., GET and SET methods). FIG. 2 illustrates the high-level-concept with access-classes, according to one example embodiment of the present invention. As illustrated, the application-specific access class 215 serves as single point of communication for applications (e.g., as used by user 210) using the interface. The interface 215 effectively replaces the prior used GUI 115 with a stateful backend API-type interface, that allows for delivery of input to the underlying business logic 220 in the form and sequence the business logic 220 expects. Thus, any number of user level applications may pass through the interface, and business logic 220 and business data 230 operate as usual (e.g., as they would with the old GUI 115).

Figure 3:
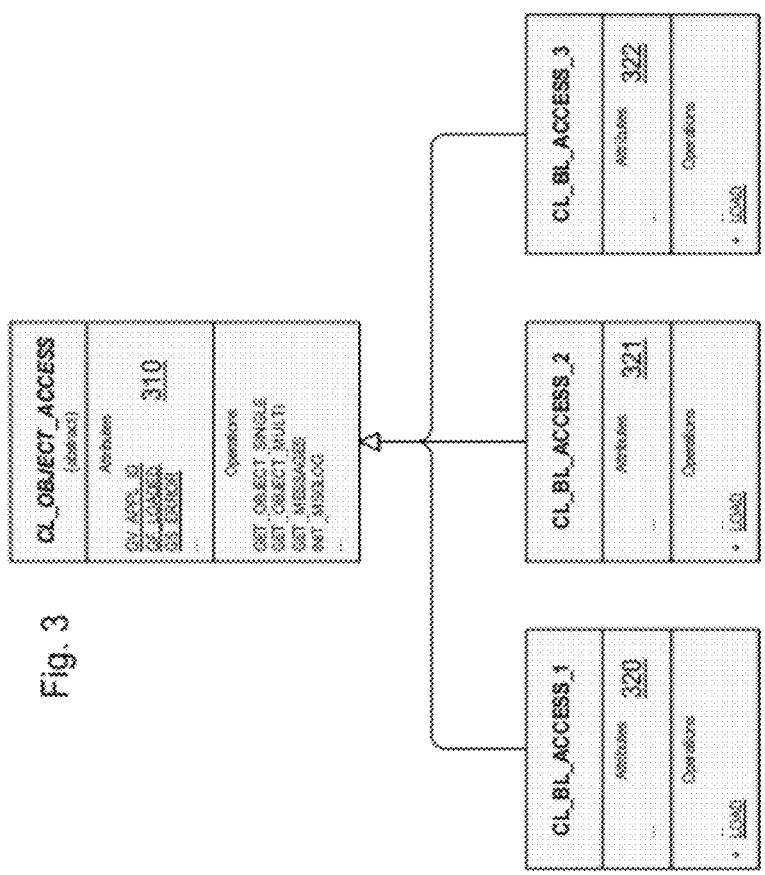
FIG. 3 illustrates an object structure as defined in one part of one example embodiment of the present invention.

As already described, each business object can be accessed via a so-called object-specific access-class. The object-specific access-class may be derived from a generic access-class (e.g., CL_OBJECT_ACCESS of FIG. 3). This generic access-class already implements the most important methods, e.g., those declared as final in the development. The generic GET- and SET-methods are examples of final methods. After the generic methods, specific methods may be redefined for the object-specific access-class (e.g., method SAVE_INTERNAL) or may be created newly (e.g., LOAD). FIG. 3 illustrates one example inheritance from the abstract class 310, to the specific instantiations 320 to 322.

Figure 4:
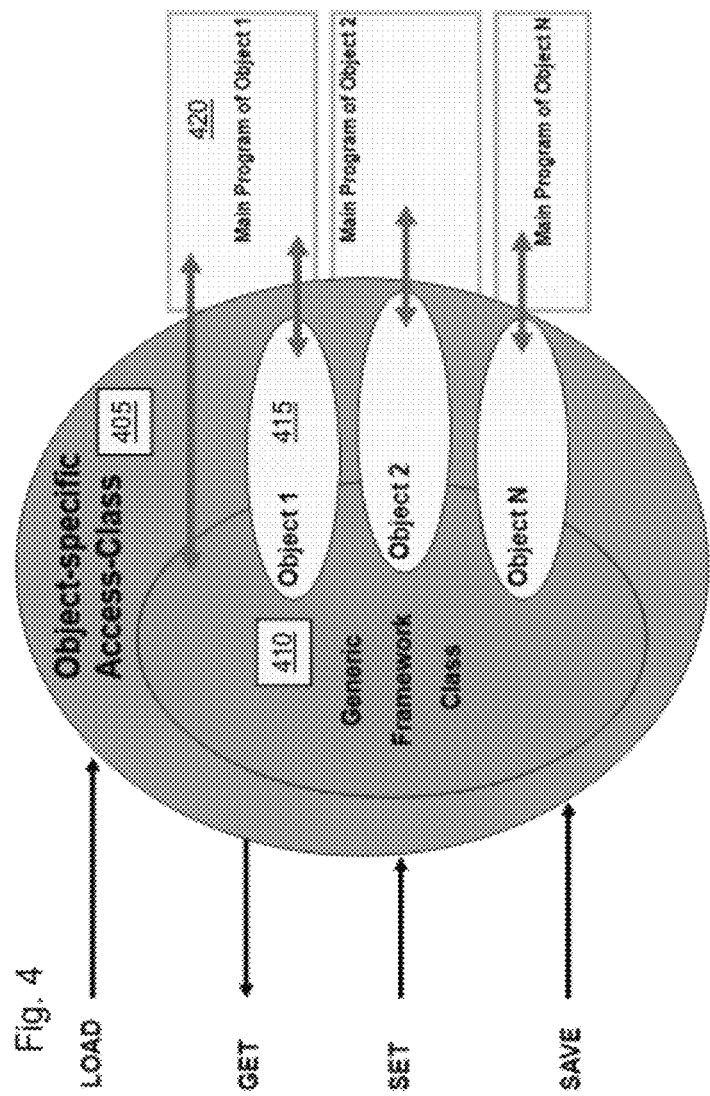
FIG. 4 illustrates an object architecture of an access/framework class, according to one example embodiment of the present invention.

FIG. 4 illustrates one example embodiment of the object-specific access class 405 as the single point of communication. Inside the access class, user requests are delegated to a framework class 410, which handles preparation, processing, and buffering of business data and therefore processes the user requests (e.g., GET, LOAD, SAVE, SET). The mentioned framework class is represented by class CL_OBJECT_ GENERIC. The framework 410 represents the generic framework for each instance, while each instance of this class (e.g., 415) represents a single instance of the business logic (e.g., 420).

Business transactions (e.g., 115) are normally divided into different sub-objects, which includes partial quantities of logically interrelated fields of the business object e.g., header data, which may contain data that affects the complete business object, and item data that may contain all the information regarding ordered article and quantities, and further dependent objects.

This existing architecture (e.g., FIG. 1) is also represented in the architecture of the generic object access layer. This may be realized by a generic object class, which may represent the generic part of the framework. During runtime each single instance of a sub-object is represented by an instance of this generic object class (e.g., 415). To reflect the individuality of each object, the generic object class might contain a reference to an instance of an object-specific class. The object-specific class may be required to implement the interface IF_OBJECT_IMPLEMENTATION. Therein, metadata for the specific object can be defined and different time points for data processing may be offered which serve to implement the object-specific business logic. The interface IF_OBJECT_IMPLEMENTATION may be required to be implemented by an application for its sub-objects. The interface may offer different methods like a method for preparing data, or for checking data. Within these well-defined methods, specific business-logic of the sub-objects may be implemented. These might also be done by pure re-use of existing business logic. During the processing of an application the generic object class may call the well-defined method of this interface, which may guaranty the call of these methods on pre-defined time-points. Examples of methods offered by this interface may include the possibility to define communication structures for the sub-object, to define preparing logic if data is requested by users, or to define business logic that has to be called during data processing (e.g., a check for data provided by a user).

During runtime the generic object class may act as the framework, while the access class may delegate user requests to the generic class. Therein the framework logic is performed, which includes generic operations based on metadata and calls to the object-specific class. In the object-specific class specific steps like data preparation or determination of necessary calls to business logic are done. Based on the time-point the generic object class performs actions based on information from the object-specific class or the object-specific-class itself performs or calls the business logic.

Figure 5:
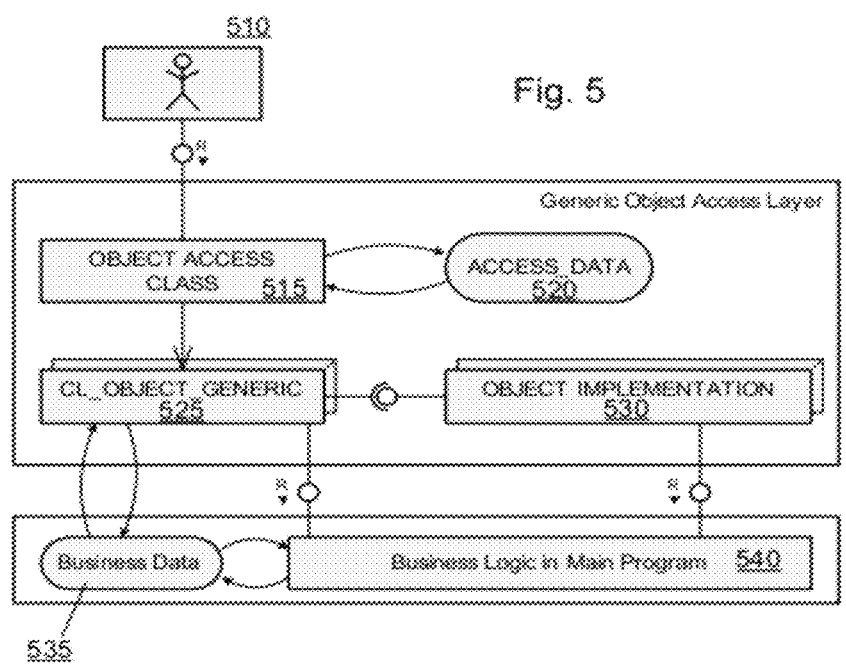
FIG. 5 illustrates an example relational diagram for the generic object access layer, according to one example embodiment of the present invention.

FIG. 5 illustrates another example embodiment of the object access layer and its relation to a user and the business functions. For example, a user 510 may send a request to the object access class 515, which includes access data 520, which may be necessary to start or initialize the business transaction, such as information about whether a business object is created or changed. The object access class 515 may instantiate one or more specific business function object interfaces, which may include a generic portion 525 (e.g., as illustrated at 310 of FIG. 3), and a specific implementation (e.g., as illustrated at 320 to 322). Functions defined in these interfaces (e.g., 525 and 530) may send requests to the pre-existing business logic 540, which in turn accesses the business data 535 as usual. Additionally, the generic portion of the access interface (e.g., 525) may have some direct access to the business data 535 (e.g., via GET and SET methods). Since the generic portion of the access interface might contain only functions common to every interface, that have been finalized in development, those functions may be allowed direct access, but access may still be via the interface (e.g., the 525 generic part), and not directly by a user GUI, as discussed previously.

Figure 6:
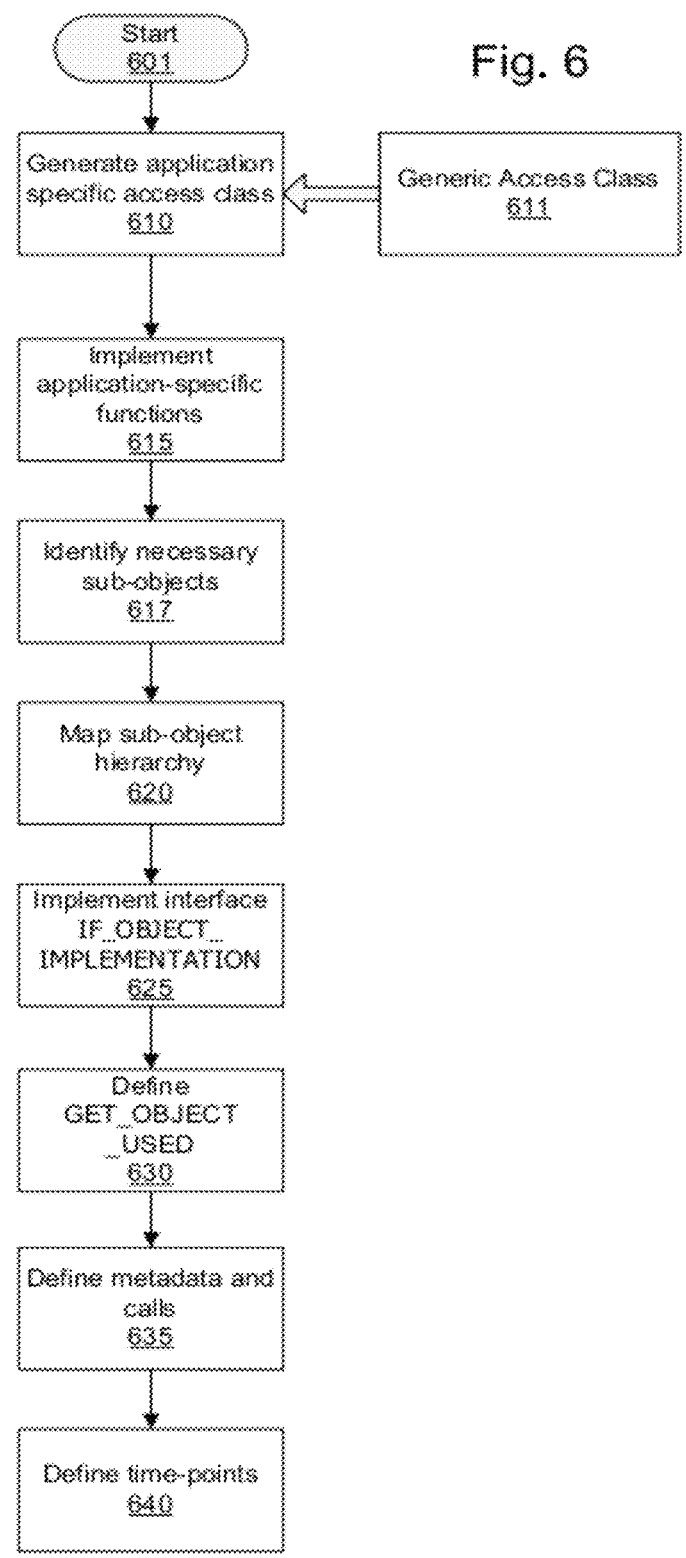
FIG. 6 illustrates an example method, according to one example embodiment of the present invention.

FIG. 6 illustrates one example method of constructing an access interface, according to one example embodiment of the present invention. Starting at 601, the example method first generates an application specific access class, at 610, as an instance of a generic access class 611. The example method may then implement and define functions specific to the associated application, e.g., at 615. Next, at 617, the example method may identify the necessary sub-objects of the specific application, which may include those sub-objects that should be offered by the interface. At 620, the example method may create a map or hierarchy of those necessary sub-objects.

Next, at 625, each identified sub-object has a class created, which implements the interface IF_OBJECT_IMPLEMENTATION. This class represents the individual sub-objects. After defining these sub-objects, at 630, the application may implement GET_OBJECT_USED, which then declares from an application level, which objects belong to the application (e.g., an ID for each object), and which class (e.g., the classes implemented in 625) represents the sub-object. If an object is not registered via method GET_OBJECT_USED, then in this example embodiment, there is no access to this object within the access class. At 635, the example method may define metadata and calls used to access the necessary sub-objects. Finally, at 640, the interface may define specific logic for defined time-points. The time-points may facilitate the interface providing a stateful repository of input, while providing the input in a specific sequence and configuration to the underlying business function object and/or sub-objects.

Figure 7:
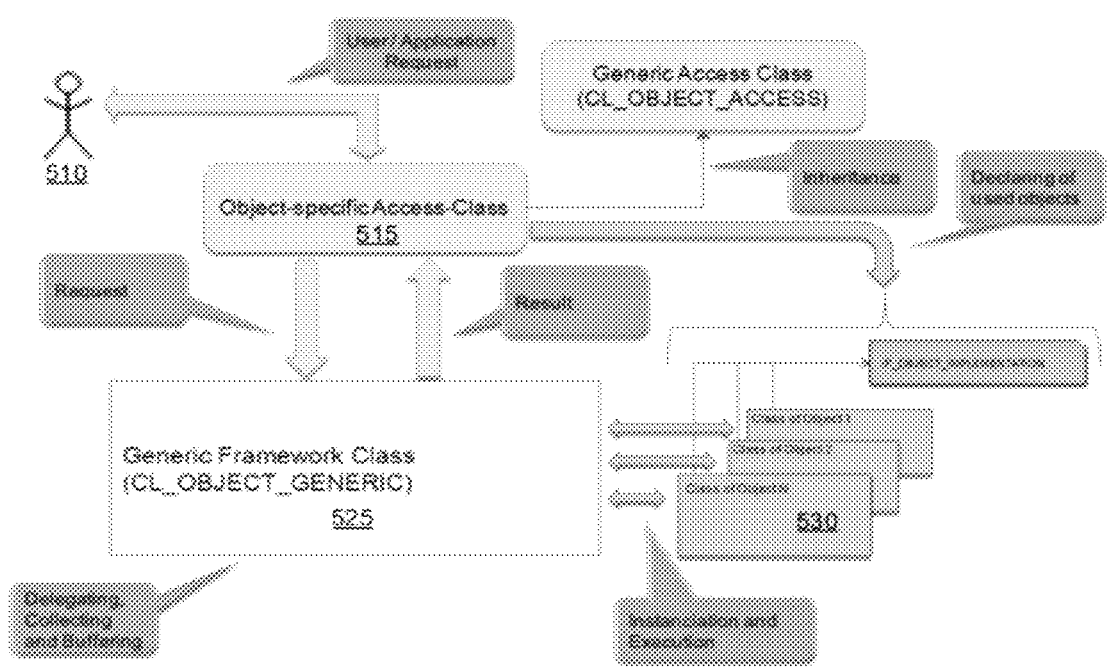
FIG. 7 illustrates another example relational diagram, according to another example embodiment of the present invention.

FIG. 7 illustrates an example method, e.g., similar to the method illustrated in FIG. 6, as it may relate to an example system, e.g., similar to the system illustrated in FIG. 5. As such, FIG. 7 uses like element labels from FIG. 5. As illustrated, an application specific access class is created (515) via inheritance of class CL_OBJECT_ACCESS. Next, application-specific functions are implemented (e.g., SAVE and LOAD) (e.g., 515 and/or 530). The method may also define which sub-objects will be offered and create an object hierarchy. Also, the used objects and the representative object classes may be defined in the redefinition of function GET_OBJECT_USED of the object specific access class. For example, next to the name the class may be defined, which may implement the sub-object specific logic. In addition, it may define how sub-objects interrelate to each other (e.g. items might correspond to one header). The re-definition in this case may mean to give the abstract method a concrete implementation.

Next, for each defined sub-object a class which implements interface IF_OBJECT_IMPLEMENTATION is created (or an existing class may be re-used). The interface IF_OBJECT_IMPLEMENTATION offers well-defined attributes and methods, that are relevant for all sub-objects. Even the implementation of the interface method may be object-specific and describes and defines the business logic of the sub-object with respect to preparation for reading object data and processing logic for changing object data. Additionally, mapping information and the object hierarchy (e.g., allowed children) may also be defined.

Figure 8:
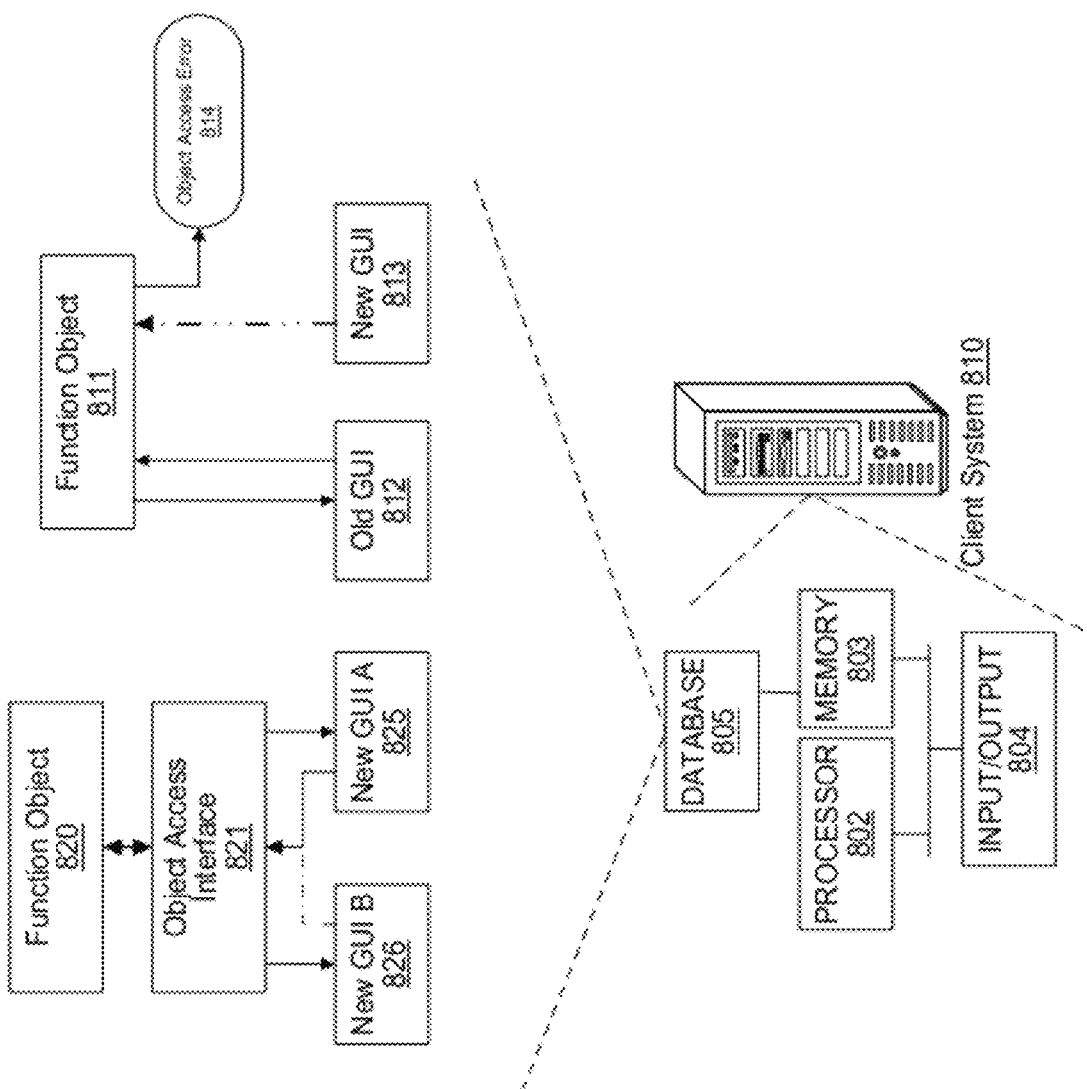
FIG. 8 illustrates an example system, according to another example embodiment of the present invention.

FIG. 8 illustrates one example system, according to an example embodiment of the present invention. The example may include one or more server computer systems, e.g., Client system 810. This may be one server, a set of local servers, or a set of geographically diverse servers. Each server may include an electronic computer processor 802, one or more sets of memory 803, including database repositories 805, and various input and output devices 804. These too may be local or distributed to several computers and/or locations. Database 805 may store and facilitate, along with the other components, the business function objects and object access interfaces discussed above. Here, function object 811 is illustrated without an access interface. As such, the old GUI 812 that was designed in conjunction with function object 812 may operate as normal. However, new GUI 813 is illustrated attempting to send an unexpected form of input, which may cause an error 814. Function 820 has an associated access interface 821, which may effectively decouple it from any specific GUI arrangement. As shown new GUI A (e.g., having a first GUI technology/architecture) and new GUI B (e.g., having a different GUI technology/architecture), may both use the access interface 821 as a single point of access, while successfully receiving results from the function object.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable medium, e.g., memory 803, with instructions to cause a processor, e.g., processor 802, to execute a set of steps according to one or more example embodiments of the present invention.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable storage medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A system for providing an access interface to decouple an underlying user-defined functional object from an existing user interface (UI), comprising:
an electronic processor and an electronic storage medium configured to provide the access interface to the underlying user-defined functional object, wherein the underlying functional object includes a plurality of sub-objects, at least two of the plurality of sub-objects corresponding to different business transactions, wherein each sub-object includes at least one function and each sub-object is configured to receive a specific sequence of inputs and provide an output based on the specific sequence of inputs, and wherein the sub-objects are configured to interface with a plurality of user interfaces including the existing UI that is configured to provide the specific sequence of inputs, such that direct access of the sub-objects by another UI that provides inputs in a different sequence would cause undesired affects in the system;

wherein the access interface enables the plurality of user interfaces using different interface technologies and includes a plurality of functions and is configured as a single point of access to the underlying functional object and the plurality of sub-objects via the functions;

wherein the interface receives and forwards any output from the sub-objects and handles any error exceptions caused in the sub-objects.

2. The system of claim 1, wherein the access interface is an object-specific access-class instance derived from a generic access-class, wherein the generic access-class includes commonly used functions, and the object-specific access-class instance further defines object-specific functions.

3. The system of claim 1, wherein the access interface receives, prepares and processes input to the sub-objects.

4. The system of claim 3, wherein the preparing includes collecting all necessary input in a stateful manner.

5. The system of claim 3, wherein the processing includes delivering the input to a particular sub-object in a specific sequence that models how the existing UI is configured to provide the specific sequence of inputs.

6. A method for providing an access interface to decouple an underlying user-defined functional object from an existing user interface (UI), comprising:

generating an application specific access class for an underlying user-defined functional object using a generic access class;

implementing application-specific functions;

identifying a plurality of sub-objects, at least two of the plurality of sub-objects corresponding to different business transactions, of the underlying functional object that require access, wherein each sub-object includes at least one function and each sub-object is configured to receive a specific sequence of inputs and provide an output based on the specific sequence of inputs, and wherein the sub-objects are configured to interface with a plurality of user interfaces including the existing UI that is configured to provide the specific sequence of inputs, such that direct access of the sub-objects by another UI that provides inputs in a different sequence would cause undesired affects in the system;

instantiating a data-preparation class for each of the plurality of sub-objects to provide data how each sub-object is configured to receive that data; and wherein each data preparation class performs message handling and error handling consistent with the existing UI, and wherein the access interface enables the plurality of user interfaces using different interface technologies and includes a plurality of functions and is configured as a single point of access to the underlying functional object and the plurality of sub-objects via the functions.

7. The method of claim 6, wherein the generic access-class includes commonly used functions, and the application specific access class instance further defines the application-specific functions.

8. The method of claim 6, wherein the access interface includes each data preparation class, which prepares and processes input to the sub-objects.

9. The method of claim 8, wherein the preparing includes collecting all necessary input in a stateful manner.

10. The method of claim 8, wherein the processing includes delivering the input to a particular sub-object in a specific sequence that models how the existing UI is configured to provide the specific sequence of inputs.

11. A non-transitory computer-readable storage medium encoded with instructions configured to be executed by a processor, the instructions which, when executed by the processor, cause the performance of a method, comprising:

generating an application specific access class for an underlying user-defined functional object using a generic access class;

implementing application-specific functions;

identifying a plurality of sub-objects, at least two of the plurality of sub-objects corresponding to different business transactions, of the underlying user-defined functional object that require access, wherein each sub-object includes at least one function and each sub-object is configured to receive a specific sequence of inputs and provide an output based on the specific sequence of inputs, and wherein the sub-objects are configured to interface with a plurality of user interfaces including the existing UI that is configured to provide the specific sequence of inputs, such that direct access of the sub-objects by another UI that provides inputs in a different sequence would cause undesired affects in the system;

instantiating a data-preparation class for each of the plurality of sub-objects to provide data how each sub-object is configured to receive that data; and wherein each data preparation class performs message handling and error handling consistent with the existing UI, and wherein the access interface enables the plurality of user interfaces using different interface technologies and includes a plurality of functions and is configured as a single point of access to the underlying functional object and the plurality of sub-objects via the functions.

12. The non-transitory computer-readable storage medium of claim 11, wherein the generic access-class includes commonly used functions, and the application specific access class instance further defines the application-specific functions.

13. The non-transitory computer-readable storage medium of claim 11, wherein the access interface includes each data preparation class, which prepares and processes input to the sub-objects.

14. The non-transitory computer-readable storage medium of claim 13, wherein the preparing includes collecting all necessary input in a stateful manner.

15. The non-transitory computer-readable storage medium of claim 13, wherein the processing includes delivering the input to a particular sub-object in a specific sequence that models how the existing UI is configured to provide the specific sequence of inputs.

* * * * *